United States Patent [19]

Ditcher

[11] 4,103,901
[45] Aug. 1, 1978

[54] MOLDED PLEATED GASKET AND DEVICE FOR INSTALLING SAME ON PIPE

[75] Inventor: John Ditcher, Langhorne, Pa.

[73] Assignee: A-Lok Corporation, Trenton, N.J.

[21] Appl. No.: 754,109

[22] Filed: Dec. 27, 1976

[51] Int. Cl.² .................. F16J 15/10; B23P 19/00
[52] U.S. Cl. ................................ 277/9.5; 277/11;
  277/186; 277/207 A; 29/235; 285/27; 285/230
[58] Field of Search ............... 285/189, 192, 230, 27,
  285/425, 332.2, 332.3, 239–241, 18, 24; 52/21;
  137/363, 372; 277/181–186, 189, 207 A, 9, 9.5,
  10, 11; 61/10; 138/96 R; 29/235, 235.5, 450,
  451

[56] References Cited

U.S. PATENT DOCUMENTS

| | | | |
|---|---|---|---|
| 865,498 | 9/1907 | Kenyon | 29/235 |
| 1,025,759 | 5/1912 | McCluskey | 285/27 |
| 2,196,622 | 4/1940 | Bean | 285/332.3 |
| 2,329,000 | 9/1943 | Rembert | 29/451 X |
| 2,490,907 | 12/1949 | Kellaher et al. | 285/27 X |
| 2,743,121 | 4/1956 | Stevens | 277/3 |
| 3,121,583 | 2/1964 | Damm | 285/27 X |
| 3,282,610 | 11/1966 | White | 285/18 |
| 3,327,379 | 6/1967 | Clements | 285/27 X |
| 3,347,083 | 10/1967 | Turpin et al. | 29/235 X |
| 3,369,817 | 2/1968 | Bandy et al. | 277/11 |
| 3,709,163 | 1/1973 | Smedley et al. | 285/27 X |
| 3,744,806 | 7/1973 | Keyser | 285/192 X |
| 3,759,280 | 9/1973 | Swanson | 285/158 X |
| 3,924,861 | 12/1975 | Szepesvary | 277/185 |

FOREIGN PATENT DOCUMENTS

| | | | |
|---|---|---|---|
| 1,024,718 | 1/1953 | France | 277/186 |
| 1,273,924 | 7/1968 | Fed. Rep. of Germany | 138/96 R |
| 1,808,655 | 2/1970 | Fed. Rep. of Germany | 277/184 |
| 1,059,749 | 2/1967 | United Kingdom | 138/96 R |
| 1,116,951 | 6/1968 | United Kingdom | 138/96 R |

*Primary Examiner*—Robert S. Ward, Jr.
*Attorney, Agent, or Firm*—Andrew R. Klein

[57] ABSTRACT

A gasket for resiliently supporting a sewer pipe in a manhole opening, while sealing the opening against fluid flow, which gasket is a molded annulus of elastomeric material having a peripheral flange of substantial width and thickness connected by a radially extending web to an inner concentric rib of greater width than said web, and adapted to be embedded in concrete to its radially inward face, said rib having an integral circular skirt extending inwardly therefrom in a non-radial direction, and united at its rim with a second circular skirt oriented thereto at a reverse angle, said second skirt merging throughout its periphery into an O-ring of slightly smaller diameter than the diameter of the sewer pipe it is adapted to surround.

9 Claims, 7 Drawing Figures

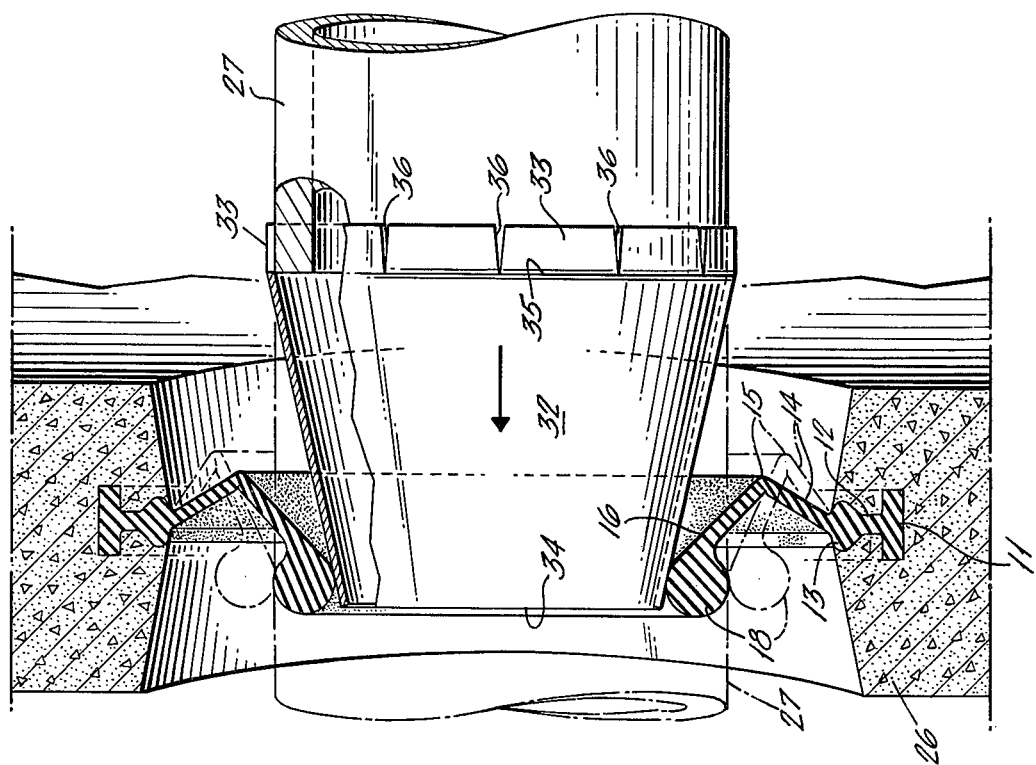
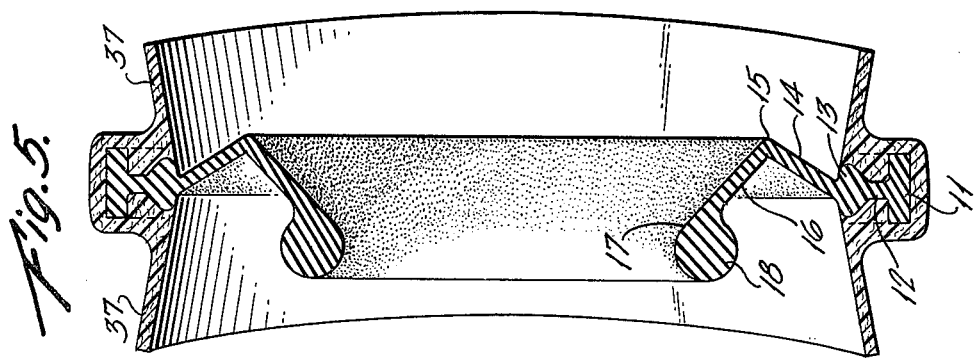
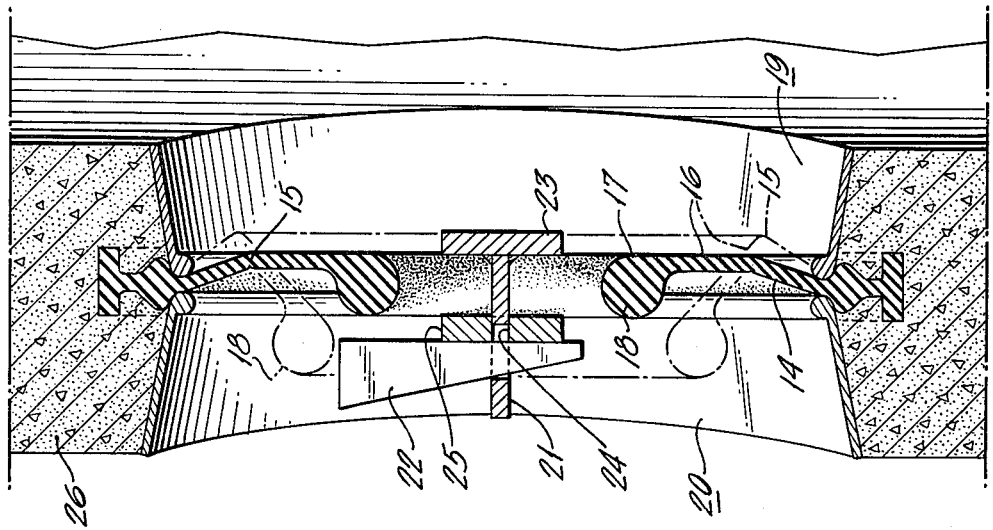

MOLDED PLEATED GASKET AND DEVICE FOR INSTALLING SAME ON PIPE

This invention relates to the provision of a new form of elastomeric molded gasket particularly useful for resiliently supporting a sewer pipe in an opening through the wall of a manhole. It also provides a tight seal, closing the space between the wall of the opening and the pipe.

Several proposals have been offered for this purpose in times past, including the extruded gasket ring described and claimed in my own patents, U.S. Pat. Nos. 3,813,107, 3,796,406, and 3,832,438, and in my co-pending application, Ser. No. 710,264, filed July 30, 1976. These structures are very well adapted for use with sewer pipe of substantial size. They teach the use of a gasket having a hollow nose section integral with a base member which latter is embedded in the concrete lining the opening, through which the pipe passes. But they are made by cutting a length of the lineal extrusion to a size corresponding to the circumference of the pipe, curving it into the form of a cylinder, uniting the ends, and then flattening the wall so as to produce a disk-like washer, which must be held against considerable internal stress until the concrete has set. In producing gaskets of relatively small diameter, say 4 inches or 6 inches, the strains involved in constraining the cylindrical tubular gasket into a disk-like shape are so great as to limit the use of the small-diameter sizes.

It has also been proposed, more or less frequently, to use molded gaskets of elastomeric material and shaped like an ordinary washer - that is, as an apertured disk lying in a single plane. Such washers are embedded in concrete about their outer margin, and lie normal to the axis of the pipe. They are subject to the disadvantage that the elastomer used has limited stretch in a radially outward direction. That is, even though it can be made with an undersized hole, so that the pipe will stretch the material on being inserted, the amount of stretch is not sufficient, in the plane of the gasket, to provide enough freedom for distortion to preserve a tight seal.

The shear stress imposed on sewer pipe passing through a manhole opening may be very severe indeed - sometimes it is sufficiently substantial to break the pipe right off. If the load, including not only the weight of the pipe and its contents, but also that imposed by fill, traffic stress, and vibration, is great, the pipe will be driven down into the inner edge of the rubber in the lower part of the gasket - that is, directly under the pipe - and the amount of compression may be sufficient to cause the top of the pipe to pull away from the inner upper edge of the gasket, thus leaving a small but ruinous lunar opening between gasket and pipe. If the elasticity of the elastomeric material is sufficient to ensure that its upper rim will follow the pipe even under the stress conditions stated, it is probably so "tight" that insertion of the pipe is practically impossible. This factor is important, for the choice of elastomeric material is limited. The ASTM specifications for rubber gasketed sewer pipe are quite strict. The elastomer usually conforms to ASTM 443, SBR 1200, or to ASTM 361, Polystyrene, TS 2400.

If the embedded portions of the gasket are planar and extend in a normal direction away from the pipe, they may be pulled right out of the concrete in which they are embedded, under stress of axial movement of the pipe.

Netherlands Pat. No. 290,612 of 1963 illustrates a gasket seal for service of the type herein contemplated. It shows a gasket in the shape of a washer, having a corrugated face and having a rim embedded in concrete. Pressure of the pipe entering the washer distorts the latter, and effects a seal between pipe and opening. Unfortunately, if the material of which the gasket is composed is too stiff, it will not permit easy insertion of the pipe, or, if not stiff enough, it will permit tiny lunar spaces to open up, under the stress of traffic shocks, through which water can flow.

The present invention comprises the concept of providing a firm support for the pipe, which is sufficiently resilient to compensate for stress in shear, sufficiently flexible to accommodate extensive misalignment of the pipe, and yet capable of affording an absolutely fluid-tight seal in the rim of the opening. The gasket of the present invention is easy to install, comparatively inexpensive to make, and extremely reliable in use.

How these and other advantages of the invention are attained will become evident as this description proceeds, reference being had to the accompanying drawings, which illustrate a preferred embodiment of the invention, and in which:

FIG. 4 is a vertical section showing the mold and gasket after the concrete has been applied;

FIG. 5 is a vertical section, partly in elevation, showing an alternative embodiment;

Figure 7:
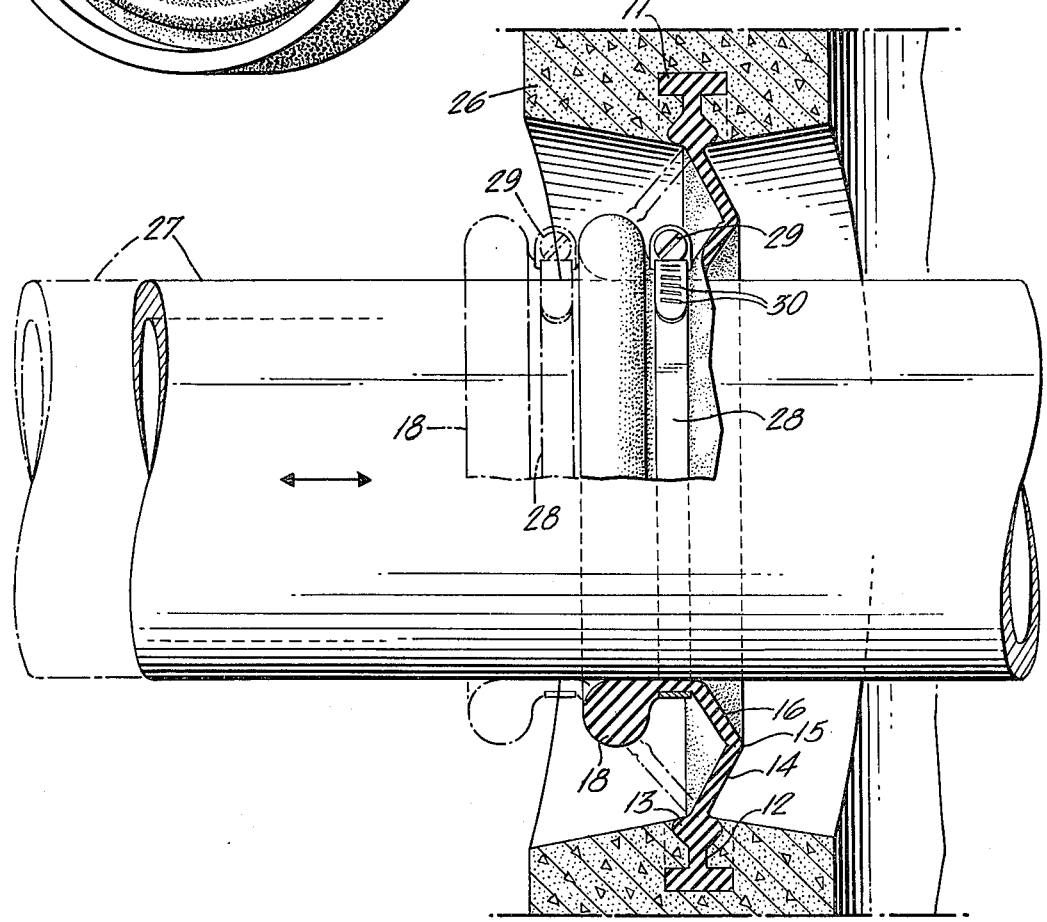

FIG. 6 is a vertical section. The mold has been removed, and the pipe is being inserted, using a novel accessory. The showing in broken lines illustrates the position of the parts after the insertion of the pipe; and FIG. 7 is also in vertical section, partly in elevation, showing a modification of the device.

Figure 1:
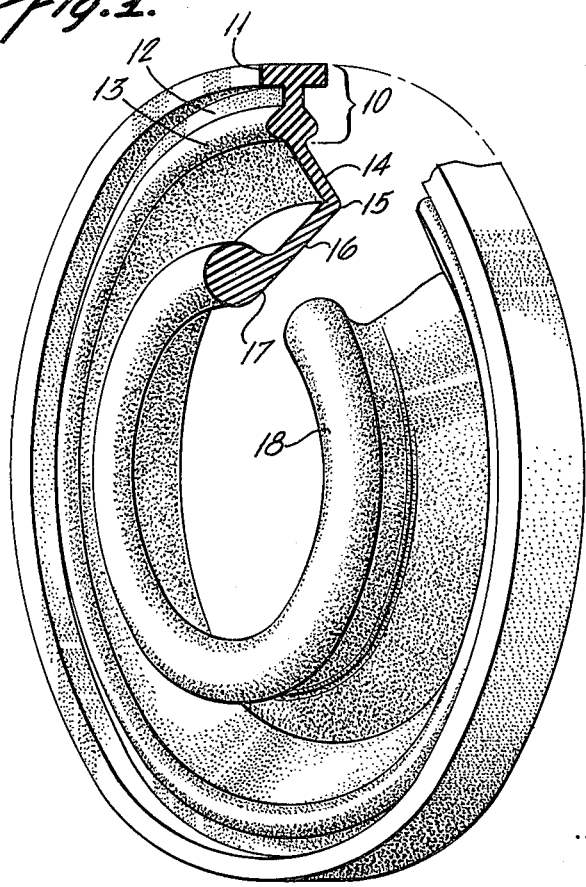
FIG. 1 is a perspective view of the gasket of this invention, being broken away to show a radial section.
Figure 2:
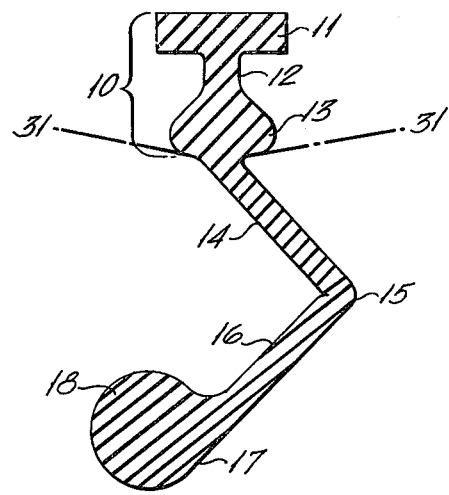
FIG. 2 is a cross-section.

Turning now to FIGS. 1 and 2: The gasket is a molded, disklike object of elastomeric material. It has a peripheral flange structure 10 adapted to be embedded in concrete. This comprises the outer band 11, the radially-extending web 12, and the bulblike inner ring 13. The shape may be thought of as a capital T, with a bulbous enlargement at the base of the T. The broken line 31—31 shows the level to which the flange structure is embedded.

From the bulblike ring 13 of the flange structure, the gasket extends as an outer skirt 14, which is reversely angled at 15 to form the inner skirt 16. This skirt 16 extends from the pleat or fold 15 towards the center of the disk, and merges, at its inner edge 17, with an O-ring or torus 18. The torus has a slightly smaller inner diameter than the outside diameter of the pipe it is expected to surround.

It may be mentioned that the bulblike ring 13 not only supplies a thickened rib right where stress is great; it also provides a rolling surface against which the outer end of the skirt 14 may bear; and it also aids in positioning the gasket in the mold rings now to be described.

Figure 3:
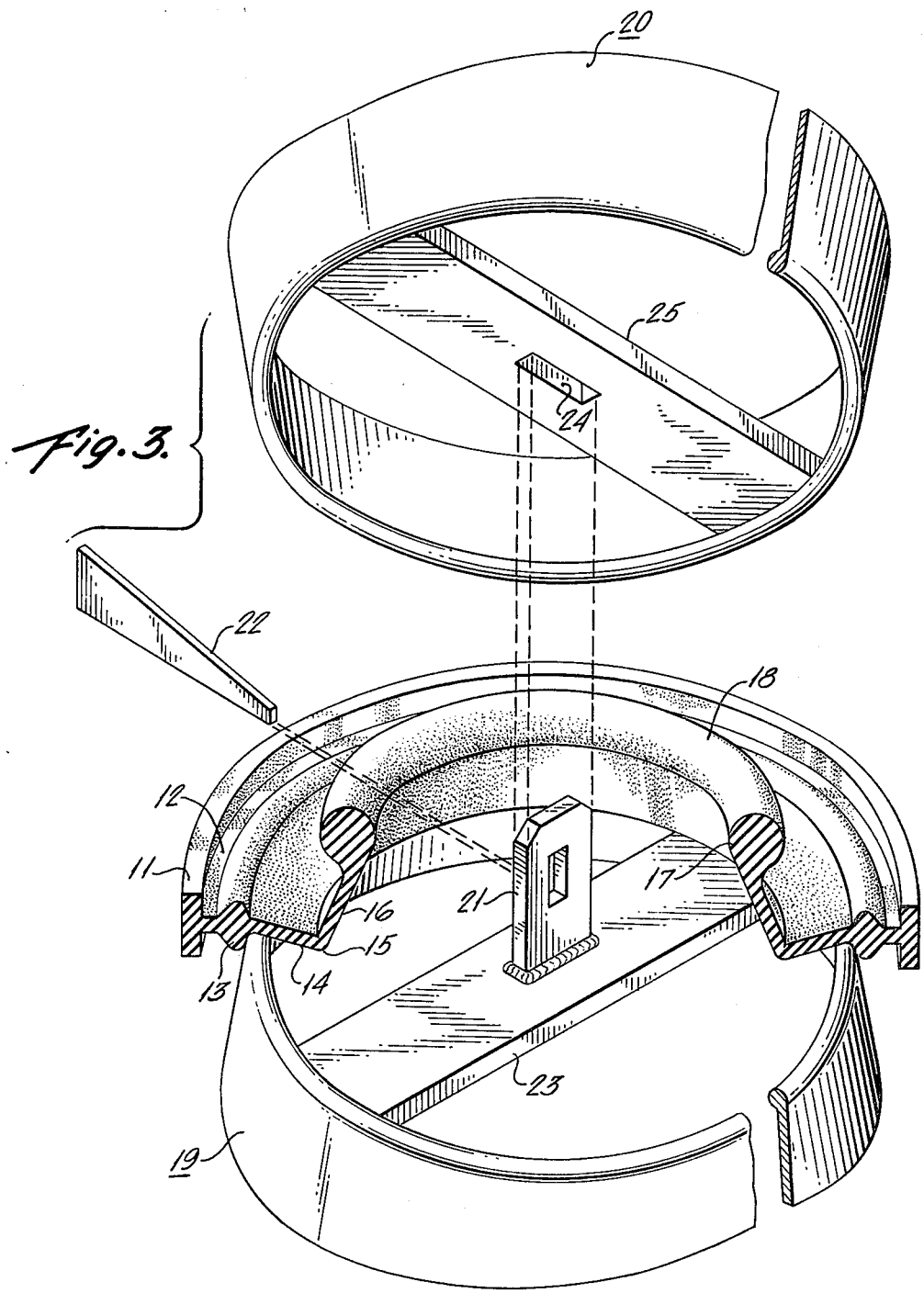
FIG. 3 is a perspective, exploded view, showing the type of mold used for holding the gasket (a portion of which is broken away for better illustration) while it is being embedded in concrete.

The exploded view of FIG. 3 shows the gasket in place on the lower mold ring 19. The upper mold ring 20 is lowered into place upon the skirt 14 and within the bulbous ring 13 of the gasket. The rings are clamped together by means of the slotted bracket 21 and the key 22. The slotted bracket is mounted on the spanning strap 23 and projects through a slot 24 provided in the spanning strap 25 which pertains to the upper ring 20. The operation is clear. Concrete is applied around the outer surfaces of the rings 19 and 20 in quantities sufficient to consolidate the parts and, if the mold is used in the field, to fill the space between the mold rings and the opening in the manhole wall. After it has set, the key 22 is knocked out and the mold shells are removed. A technique for precasting the assembly in the shop will be later described.

FIG. 4 shows the mold rings in operation. The concrete 26 has been emplaced, after clamping the gasket between the mold rings. The showing of the outer skirt 14 and the inner skirt 16 is somewhat exaggerated. They will be flattened, as shown in solid lines, in the areas where the spanning straps 23 and 25 confine them, but they are likely to take a less confined position in a locus at right angles to the straps, somewhere between the solid line showing and that of the broken lines.

For ease of handling, it is sometimes desirable to embed and gasket in settable material before it is taken from the shop to the field. This may conveniently be done by encasing the mold rings and the gasket in a body of settable material, applied in the shop. After the concrete has set and the mold rings have been removed, the gasket, embedded in a cylindrical plug of set material, is transferred to the field of operation, where it is inserted in the opening in the manhole wall and is fixed in place with grouting or cement.

Instead of embedding the gasket flange in concrete, it may be encased in plastic. If this is done, the preferred method is to spray the outer faces of the mold rings and the gasket flange with liquid polyester resin components mixed with short glass fibers. Such a mixture sets up very quickly and forms a rigid plug which can be easily handled and installed. A commercially available unit for use in this work is known in the trade as a "Polygun with Fiberglass Chopper." Such a tool is sold by Ransburg Electric-Coating Corp., Indianapolis, under the trademark "Ratio Master."

FIG. 5 shows this optional variant, wherein the settable material, instead of being concrete, is a fiber-reinforced plastic. After the mold rings are removed, the layer of plastic flares outwardly from the gasket in the shape of opposed frusto-conical shells 37, which can be handled very readily, and can be cemented into place in the manhole opening even by unskilled labor. The shells flare outwardly on either side of the gasket in order to accommodate angular variations in the alignment of the pipe.

I have used this technique of precasting the assembled unit into a plug of settable material in connection with the extruded gaskets shown in my previous patents and in my pending application. Because the extruded gasket is under severe internal stress, it takes a substantial body of settable material to hold it firmly enough to prevent distortion under the stress imposed. One of the advantages of the present invention is that the molded gasket is not subjected to any such internal stress, and can therefore be firmly embedded in settable material applied in a substantially thinner layer. The consequent reduction in weight makes it easier to handle the gasket assembly, embedded in set material, than is the case where a much heavier body of material is required, as with the extruded gasket forms.

An important feature of the present invention is the concept of blending the inner portion of the inner skirt with an O-ring or torus. Such a ring has considerable elasticity and can be counted on to hug the pipe tightly if it is made sufficiently smaller than the pipe it is intended to fit. Preferably, the O-ring size is such that it will have to be stretched to an elongation of about 20% in order to hug the smallest pipe which it is meant to fit. Its limit of stretchability is an elongation of about 40%.

But the very elasticity which commends the O-ring for such a use presents a real problem when the pipe is at the point of being inserted into the gasket. The conventional terra cotta pipe of 8 inches size may have an outside diameter of as little as 8½ inches or as much as 10 inches. It is quite difficult to fit a ten-inch pipe into an O-ring having a diameter of only about 7½ inches, which is the preferred size for an 8 inches nominal size pipe. Modern cement-asbestos pipes are occasionally chamfered to aid in inserting them into gaskets, bell joints, or couplings, but clay pipe is not ordinarily chamfered, and some means is desirably provided to facilitate insertion into the torus of the gasket of this invention.

I have found that this operation can be greatly facilitated by installing a temporary metal nose-cone of frusto-conical shape, on the spigot end of the pipe. At the time of insertion the conical surface is greased or otherwise lubricated. Surprisingly little force is then required to drive the cone into the O-ring and expand that ring sufficiently to enable it to be pushed onto the outer surface of the pipe, after which the nose-cone is removed for repeated usage.

In FIG. 6 a suitable nose-cone 32 is illustrated in elevation. It is a regular conic section from its small end 34 to its largest diameter 35, where it is shaped to provide a cylindrical lip or flange 33 coaxial with the pipe 27. This nose-cone is, in effect, a sort of tapered thimble, with a cylindrical end. It is easily fabricated, preferably of 10-gauge sheet steel, and its cylindrical end is notched, as at 36,36, to allow flexing so it will readily snap over the pipe. Even with pipe having a chamfered end, the nose-cone is so easy to use that it is worthwhile to employ it.

It will be observed in FIG. 6 that the pipe 27 will distend the O-ring, and this will compress the double skirts 14 and 16 to sharpen the pleat or fold 15 in the skirt portion, as shown in broken lines. This type of distortion is very easy to produce, as contrasted to the problem of distortion when the washers are flat or almost flat. In order to take full advantage of the added resilience gained by using a pleated skirt instead of a planar disk, it is desirable to make the opening for the pipe substantially larger than normal for the size used, and to use oversized mold rings, accordingly.

The broken line showings in FIG. 6 illustrate the position of the parts when the gasket is compressed by the insertion of the pipe.

FIG. 7 illustrates a modification of the invention which may desirably be used in situations which occasionally arise wherein the pipe is of smaller diameter than the O-ring was designed to fit. In such cases, the tightness of the grip on the pipe may be increased by applying a conventional tension band 28, commonly made of stainless steel. Tension is adjusted by turning the screw 29 which is journaled in a fitting on the band and engages slots 30, formed in the band.

Since this type of instrumentality is well known, it will not be further described. It may be conveniently installed by sliding the spigot end of the pipe beyond its intended position, pulling the O-ring with it, for a distance sufficient to facilitate applying the band and tightening the screw with a screwdriver. This is suggested by the broken line showing of the outer and inner skirts and the O-ring. Thereafter, the pipe is slid back through the opening, carrying the gasket with it, to the position shown in full lines in FIG. 7. Alternatively, where there is room enough, a socketed screwhead and an Allen wrench may be used, without sliding the pipe.

It is, of course, apparent that the molded gasket ring of the present invention not only provides an entirely watertight seal between the pipe and the inner wall of the opening through which it passes, but also affords a substantial measure of flexibility and resilience, so that the pipe is firmly but yieldingly supported at all times, and is protected somewhat more effectively than with the previously used gaskets against shear stress. At the same time, a great measure of flexibility is available so that the pipe can enter the manhole from different angles, instead of being restricted to substantially radial lines, or lines normal to the manhole axis. Such misalignment as often occurs is easily accommodated. This is especially important in places where laterals are laid down hillsides to a main trunk sewer flowing on an almost horizontal plane.

Although the gasket of the present invention is particularly useful where a sewer pipe passes through an opening in the wall of a manhole, it is obviously also useful in other situations, where the problem is to create a tight resilient seal between a pipe and the wall of an opening, as where a pipe passes through the foundation wall of a dwelling, for example.

I claim:

1. A molded elastomeric gasket for resiliently supporting a sewer pipe in a manhole opening and sealing the space between the wall of the opening and the surface of the pipe, said gasket having an outer cylindrical flange member extending axially on both sides of a mid-plane which is normal to the axis of the pipe; a first web of substantial thickness extending radially inwardly from a mid-region of the inner surface of said cylindrical flange member and integral therewith, said web and said flange being adapted for embedment in settable material lining the manhole opening; an intermediate web, integral with said first web and extending at an obtuse angle radially inwardly from the mid-plane and at its inner edge being united with a third web, which extends from the juncture line at a reverse angle towards the pipe, said third web terminating in a rim portion of toroidal form, integral with said web and having an inner diameter substantially less than the outer diameter of said pipe.

2. The gasket of claim 1, further being characterized in that a bulbular enlargement is provided between the inner rim of the first web and the outer rim of the second web, thus forming a reinforcing rib where the webs join.

3. The gasket of claim 2, wherein the bulbular enlargement appears on both sides of the mid-plane of the gasket.

4. The gasket of claim 1 wherein the toroidal portion is of such a size as to require an elongation of from 20% to 40% in order to encompass the pipe it is adapted to fit.

5. The gasket of claim 1 in combination with a nose-cone of rigid material having a small end to initially penetrate the toroidal part, and a large end which merges into a cylindrical rim adapted to embrace the pipe, said nose-cone being configured to effect an elongation of from 20% to 40% in the size of the toroidal portion as the latter is moved to and beyond the large end of the cone.

6. A molded elastomeric gasket of circular shape having an inner toroidal portion adapted to closely embrace a pipe, said portion being of substantially smaller inner diameter than the outer diameter of said pipe, and said gasket having an outer peripheral flange, T-shaped in section, adapted to be fixedly anchored in settable material lining an opening in a manhole wall, with the base of the T lying radially inward of its head portion, said toroidal portion merging tangentially with an integral inner skirt portion and said outer flange merging, at the base of the T, with an outer skirt portion, the inner edge of the outer skirt being integrally joined to the outer edge of the inner skirt, the whole being characterized in that the combined width of said skirt portions is greater than the distance between the toroidal portion and the base of the T-shaped flange.

7. A molded elastomeric gasket as defined in claim 6, further comprising a tension band adapted to impose tension on the inner portion of the gasket and to clamp the same into fluid-tight engagement with the pipe, said tension band having means to retain it in position when the desired degree of tension has been imposed.

8. As a new article of manufacture, a separately handleable precast plug of set material, comprising two oppositely facing outwardly flaring shell portions of frusto-conical form, united by a peripheral channel in which is mounted the gasket of claim 2, and in which the set material completely surrounds the flange member and the radial web, and at least partially surrounds the circular rib.

9. The article of manufacture defined in claim 8 wherein the set material is a synthetic resin, reinforced with mineral fiber.

* * * * *